Figure 1:
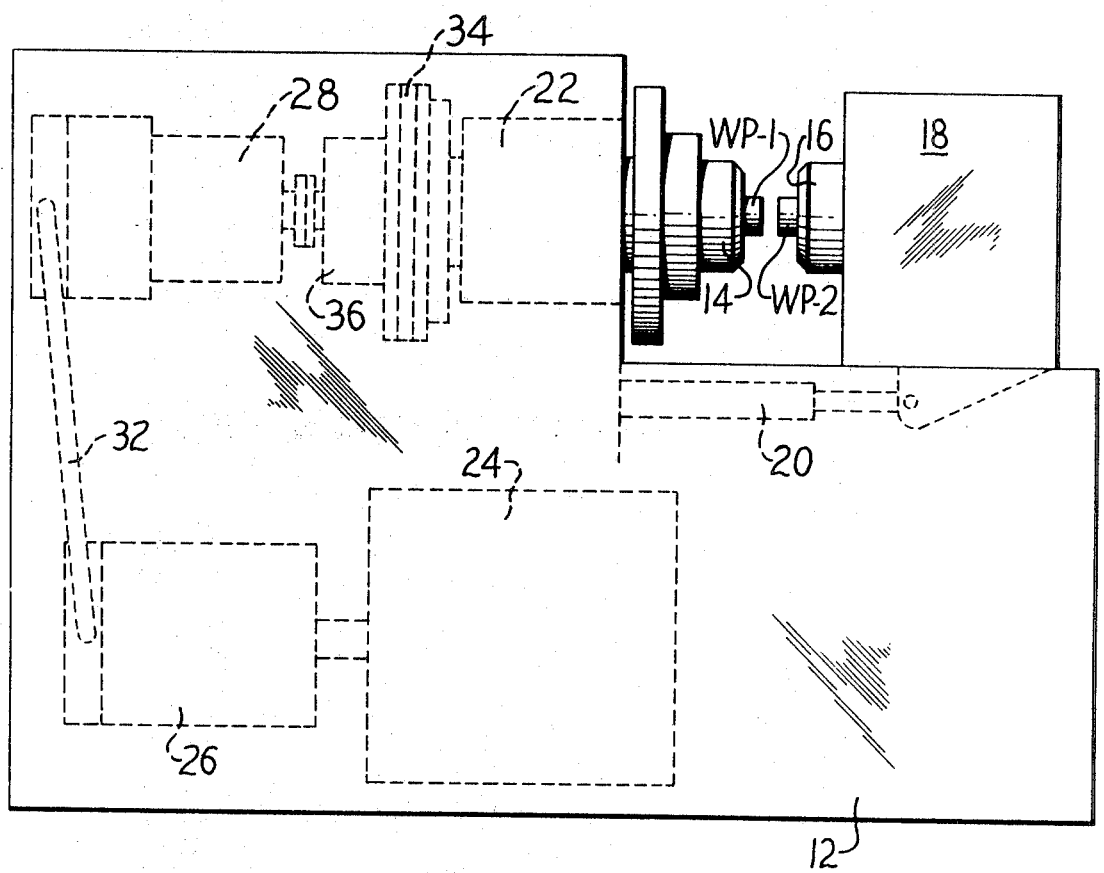

United States Patent

[11] 3,612,384

[72] Inventors Calvin D. Loyd
 Peoria;
 Theodore L. Oberle, Washington; Ronald L. Satzler, Metamora, all of Ill.
[21] Appl. No. 819,336
[22] Filed Apr. 25, 1969
[45] Patented Oct. 12, 1971
[73] Assignee Caterpillar Tractor Co.
 Peoria, Ill.

[54] SPINDLE CHUCK ACTUATOR ASSEMBLY
 15 Claims, 2 Drawing Figs.
[52] U.S. Cl. ................................................... 228/2,
 29/470.3, 269/60, 279/51
[51] Int. Cl. .......................................................... B23k 27/00
[50] Field of Search ........................................... 279/46, 51,
 52; 269/60; 228/2; 29/470.3; 156/73

[56] References Cited
UNITED STATES PATENTS

| 3,512,792 | 5/1970 | Farley et al. | 279/51 |
| 3,496,638 | 2/1970 | Staunt | 279/51 X |
| 3,395,927 | 8/1968 | Hammond | 279/51 |
| 2,565,330 | 8/1951 | Sundt | 279/51 |

Primary Examiner—John F. Campbell
Assistant Examiner—R. J. Craig
Attorney—Fryer, Tjensvold, Feix, Phillips & Lempio ABSTRACT: A spindle-mounted chuck operated for engagement with a workpiece by an axially movable member and having a rotational drive for rotating the spindle-mounted chuck, the chuck assembly including a screw mechanism for coupling the rotational drive with the axially movable member for selectively engaging the chuck assembly with the workpiece.

INVENTORS
CALVIN D. LOYD
THEODORE L. OBERLE
RONALD L. SATZLER

SPINDLE CHUCK ACTUATOR ASSEMBLY

The present invention relates to a power chucking mechanism particularly contemplated for use in a friction welding machine having a spindle-mounted chuck operated by an axially movable member. Coupling the member to converter means such as a screw assembly permits rotational driving motion to be translated into linear force for operating the chuck. Within a preferred embodiment of the present invention, this arrangement permits a single drive shaft to be selectively employed for operating the chuck and for driving the spindle in rotation.

Prior art rotary chucks have commonly been adapted for hand operation. In other designs, pneumatic or hydraulic cylinders, for example, have been used solely for operating the chucking mechanism. When the chucking mechanism is employed in production operations, these prior art arrangements tend to be time consuming and relatively expensive. In addition, the prior art means for operating the chucking mechanisms have tended to increase the complexity of the machinery with which they are associated.

Accordingly, it is an object of the present invention to provide novel chucking mechanism. In an embodiment described below, converter means such as a screw assembly are employed for operating the chucking mechanism. Power for operating the chucking mechanism may accordingly be taken directly from a drive shaft or other rotational drive means in the machinery.

It is a further object to associate spring means with the chucking assembly in order to maintain a selected gripping force upon a workpiece secured by the chuck.

It is a more specific object of the invention to employ a single drive shaft for selectively operating the chuck assembly and a spindle upon which the chuck is mounted.

Additional objects and advantages of the present invention are made apparent in the following description having reference to the accompanying drawings.

Figure 2:
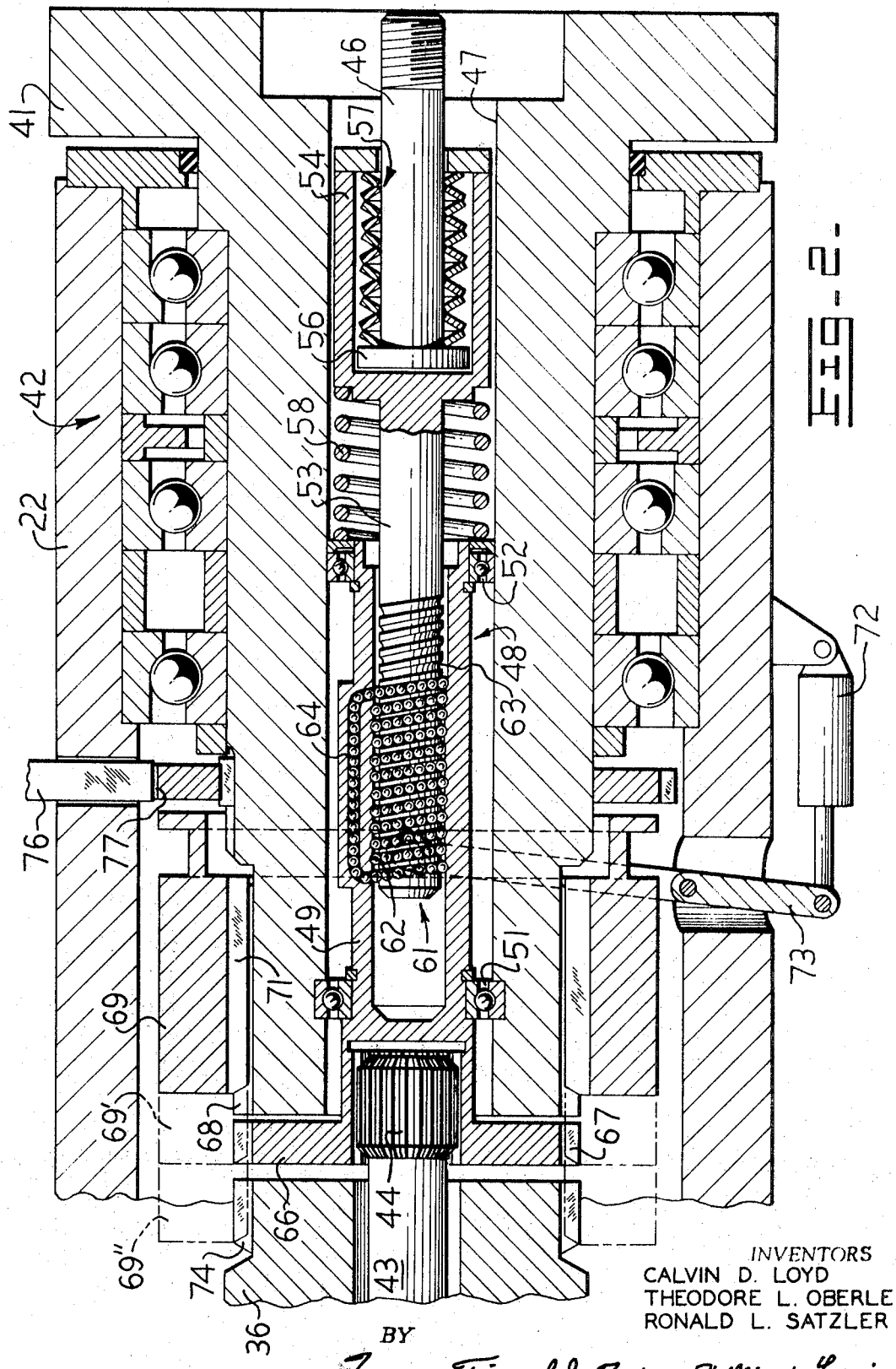

In the drawings:

FIG. 1 is a partially schematic side view of a friction welding machine within which the present spindle chucking assembly may be employed; and FIG. 2 is a fragmentary view, with parts in section, taken along the axis of a spindle assembly which may be employed in the friction welding machine of FIG. 1.

The present spindle chucking assembly is particularly contemplated for use in a friction welding machine of the type illustrated in FIG. 1. A particular embodiment of the present invention, as described below, is accordingly adapted for use in such a machine. However, it will be apparent that the present spindle chucking assembly may also be employed within numerous other types of machinery.

The friction welding machine illustrated in FIG. 1 includes a frame generally denoted at 12 for housing the various elements of the machine. Two workpieces or parts to be welded, indicated at WP-1 and WP-2, are mounted respectively within chuck assemblies 14 and 16. The chuck FIG. 2. 16 is secured against rotation upon a tailstock fixture 18. The fixture 18 is mounted for axial movement on the machine frame 12 under the control of a load cylinder 20. A pressure control circuit (not shown) regulates the pressure in the load cylinder and thus determines the force with which the parts WP-1 and WP-2 are engaged. The chucking assembly 14 is mounted for rotation upon a rotary spindle (not shown in FIG. 1) which is supported within a spindle housing indicated at 22. The chucking assembly 14 and spindle assembly supported within the housing 22 are discussed in detail below having reference to FIG. 2.

An electric motor 24 rotates the spindle through a hydrostatic transmission including a hydraulic pump 26, a hydraulic motor 28, and a manifold 32 between the pump and motor. Driving speed of the motor 28 can be varied or terminated by changing cam angles in either the pump 26 or the motor 28.

To adapt the present friction welding machine for inertia welding operation, a variable inertia mass such as the flywheel weights 34 are mounted upon a cylinder 36 which may be associated for rotation with the workpiece WP-1 in a manner described in further detail below with reference to FIG. 2.

Referring now to FIG. 2, a spindle 41 which supports the chuck assembly 14 (See FIG. 1) is mounted for rotation within a portion of the housing 22 by means of a bearing assembly 42. A drive shaft 43 axially extends from the motor 28 of FIG. 1 through the flywheel supporting cylinder 36 and has a splined portion 44 at the rear of the spindle 41.

As noted above, the chuck assembly 14 is supported for rotation with the spindle 41. The chuck assembly is operated by a drawbar 46 which extends into an axial opening 47 formed in the spindle 41. Operation of the chuck assembly 14 is controlled by longitudinal motion of the drawbar 46. As the drawbar is retracted further into the spindle, in a leftwardly direction as viewed in FIG. 2, the chuck assembly 14 is restricted or otherwise caused to grip and engage the workpiece WP-1. Extension of the drawbar toward the right as viewed in FIG. 2 conversely causes the chuck assembly 14 to be released from the workpiece WP-1.

To permit the chuck assembly 14 to be powered by the drive shaft 43, a screw assembly 48 is arranged within the spindle 41. The screw assembly includes a rotatable cylindrical member 49 mounted for rotation within the axial bore 47 of the spindle 41 by means of bearings 51 and 52. A screw or axially movable shaft 53 extends outwardly from the cylindrical member 49 and has a flanged cylindrical portion 54 at its rightward end as viewed in FIG. 2. The drawbar 46 extends into the cylindrical portion 54 with a flange 56 being formed at its leftward end. A large number of ball bearings 61 are arranged in an endless raceway formed by threads 62 and 63 in the member 49 and shaft 53 and the passage 64 internally formed in the member 49. The ball bearings 61 substantially reduce friction resulting from interaction of the member 49 and shaft 53.

A number of Belleville-type springs 57 are arranged between the flange 56 and the flanged end portion of the cylinder 54. The springs 57 tend to be compressed as the drawbar 46 is retracted by the shaft 53 to serve a safety function of insuring that the chuck assembly 14 remains engaged with the workpiece WP-1. This function of the springs 57 is described in greater detail below. A coiled spring 58 is also arranged to interact between the spindle member 41 and the housing 54 to release the spindle 14 from the workpiece WP-1 in a manner also described in detail below.

The embodiment illustrated in FIG. 2 permits the drive shaft 43 to selectively operate the chuck assembly 14 and also to selectively drive the spindle 41 in rotation. To accomplish this dual purpose, the splined portion 44 of the drive shaft is secured directly to the cylindrical member 49. The cylindrical member 49 also has a radially extending portion 66. Gear teeth are formed at 67 about the periphery of the extended member 66 in axial alignment with gear teeth at 68 about the periphery of the adjacent end of the spindle 41.

Means for selectively controlling operation of the chuck assembly 14 and the spindle 41 includes a cylindrical coupling member 69 which encircles the left end of the spindle 41. Gear teeth are formed on the inner periphery of the coupling member 69 as indicated at 71 to mate with the gear teeth 68 as well as those indicated at 67. The position of the coupling member 69 is controlled by motor means such as a hydraulic or air cylinder indicated at 72 which is attached to the coupling member 69 by means of a yoke assembly 73.

Gear teeth are also formed about the periphery of the flywheel cylinder 36 at its right end as indicated at 74. The gear teeth 74 are similarly arranged for engagement with the coupling member 69 so that the coupling member 69 may also be employed to connect the flywheels for rotation with the spindle 41.

To prevent free rotation of the spindle 41 within the housing 22 while the drive shaft 43 is being employed to operate the chuck assembly 14, a brake member 76 penetrates the housing 22 for selective engagement with gear teeth 77 formed about the periphery of the spindle 41.

In operation, the coupling member 69 is shifted to a rightward position as shown in FIG. 2 and the brake 76 is engaged with the spindle 41 to commence a welding operation. The drive shaft 43 is then rotated in an appropriate direction to shift the screw 53 to the left. Leftward motion of the screw 53 acts on the drawbar 46 through the Belleville springs 57 to engage the chuck assembly 14 upon the workpiece WP–1. As the chuck assembly 14 is tightened upon the workpiece so that it resists leftward movement of the drawbar 46, the Belleville springs are also placed in compression. In this manner, any relaxation of the force with which the chuck 14 grips the workpiece WP–1 is compensated for by the tendency of the Belleville springs to expand. The spring assembly 57 accordingly serves to insure that the chuck assembly 14 remains in firm engagement with the workpiece WP–1 during the welding process.

After the workpiece is properly engaged by the chuck assembly 14, the coupling member 69 is shifted leftwardly to a position indicated at 69' so that the rotatable member 49 of the screw assembly and the spindle 41 are coupled together. The brake 76 is released from the spindle which is then free to rotate within the housing 22 and the motor 28 (See FIG. 1) operates to drive the spindle and chuck assembly 14 in rotation.

The steps of a conventional friction welding process are carried out with the workpiece WP–1 being set in rotation and the two workpieces being brought into axial engagement by the load cylinder 20. The coupling member 69 may be shifted further leftwardly to a position indicated at 69" so that the cylinder 36 and the flyweights 34 (See FIG. 1) are also coupled for rotation with the spindle 41, the chuck assembly 14 and the workpiece WP–1.

After welding of the workpieces WP–1 and WP–2 is completed and the spindle 41 stops rotating, the coupling member 69 is again shifted to its rightward position as shown in FIG. 2 and the lock 76 is reengaged with the spindle 41. The compressed spring 58 is permitted to shift the screw member 53 and the drawbar 46 rightwardly to release the chuck assembly 14 from the workpiece WP–1 so that the bonded workpiece may be removed from the machine. Since the ball bearings provide for virtually frictionless operation of the screw assembly, minimum force is required to shift the drawbar 46 and release the chuck. With the chuck 14 released and the bonded workpieces removed from the machine, a new pair of workpieces WP–1 and WP–2 may be inserted in the chucks 14 and 16 with the process described above being repeated to carry out a new weld cycle.

What is claimed is:

1. A spindle assembly for supporting a workpiece, comprising:
    a spindle housing,
    a spindle rotatably supported in the housing,
    a chuck assembly for securing the workpiece being associated with the spindle and comprising an axially movable member for operating the chuck,
    rotational drive means for driving the spindle in rotation,
    converter means associated with the drive means and movable member for converting rotational motion of the drive means into linear motion and controlling engagement of the chuck assembly with the workpiece, and
    control means associated with the converter means for regulating operation of the chuck assembly by the drive means.

2. The invention of claim 1 wherein the control means are effective to independently regulate operation of the chuck assembly and the spindle by the drive means.

3. The invention of claim 2 further comprising a rotatable inertia mass, the control means being further effective to couple the inertia mass for rotation with the spindle.

4. The invention of claim 1 further comprising spring means interacting between the converter means and movable member of the chuck assembly with a tendency to urge the chuck into engagement with the workpiece.

5. The invention of claim 1 further comprising a spring member associated with the movable member of the chuck assembly with a tendency to release the chuck from engagement with the workpiece.

6. The invention of claim 1 wherein the spindle is hollow and the converter means are disposed within the spindle.

7. The invention of claim 6 wherein the converter means is a ball screw assembly.

8. The invention of claim 6 wherein the converter means comprises a rotatable member and a screw member threadedly associated therewith, the screw member being operatively associated with the movable member of the chuck assembly.

9. The invention of claim 8 further comprising spring means interacting between the screw member and the movable member with a tendency to urge the chuck into engagement with the workpiece, a spring member being associated with the movable member and tending to release the chuck from the workpiece.

10. A spindle assembly for supporting a workpiece comprising:
    a tubular spindle housing,
    a spindle rotatably supported in the housing, the spindle having an axial opening therethrough,
    a chuck assembly axially supported by the spindle for rotation therewith, the chuck assembly including an axially movable drawbar for engaging and releasing the clamping means with respect to the workpiece,
    rotational drive means axially disposed at the opposite end of the spindle from the chuck assembly for driving the chuck assembly in rotation,
    a screw assembly disposed within the spindle opening and coupled between the rotational drive means and drawbar for converting rotational motion into linear motion to operate the chuck assembly through the drawbar, and
    control means associated with the drive means, spindle and screw assembly for selectively regulating operation of the chuck assembly and spindle by the drive means.

11. The invention of claim 10 wherein the screw assembly comprises an axially movable member operatively associated with the drawbar and further comprising a spring assembly interacting between the movable member and drawbar with a tendency to engage the chuck with the workpiece, a spring member also being associated with the drawbar and tending to release the chuck from the workpiece.

12. The invention of claim 10 wherein the screw assembly includes an axially movable member operatively associated with the drawbar, a rotatable member operatively associated with the drive means and a plurality of ball bearings arranged in a continuous raceway formed in combination by the axially movable member and the rotatable member.

13. The invention of claim 10 wherein the rotational drive means is a shaft operatively coupled to the screw assembly, the control means being operable to selectively couple the spindle for rotation with the drive shaft, and further comprising means for selectively locking the spindle against rotation within the housing.

14. The invention of claim 13 further comprising coupling means selectively operable to effectively couple the spindle for rotation with the drive shaft.

15. The invention of claim 13 wherein the spindle assembly is a portion of a friction welding machine further comprising a rotatable inertia mass, the coupling means being further effective to selectively couple the inertia mass for rotation with the spindle.